INVENTORS
PAUL E. APPLEBY
ROBERT S. RIGGS
EDWIN S. WOODHALL
BY
AGENT

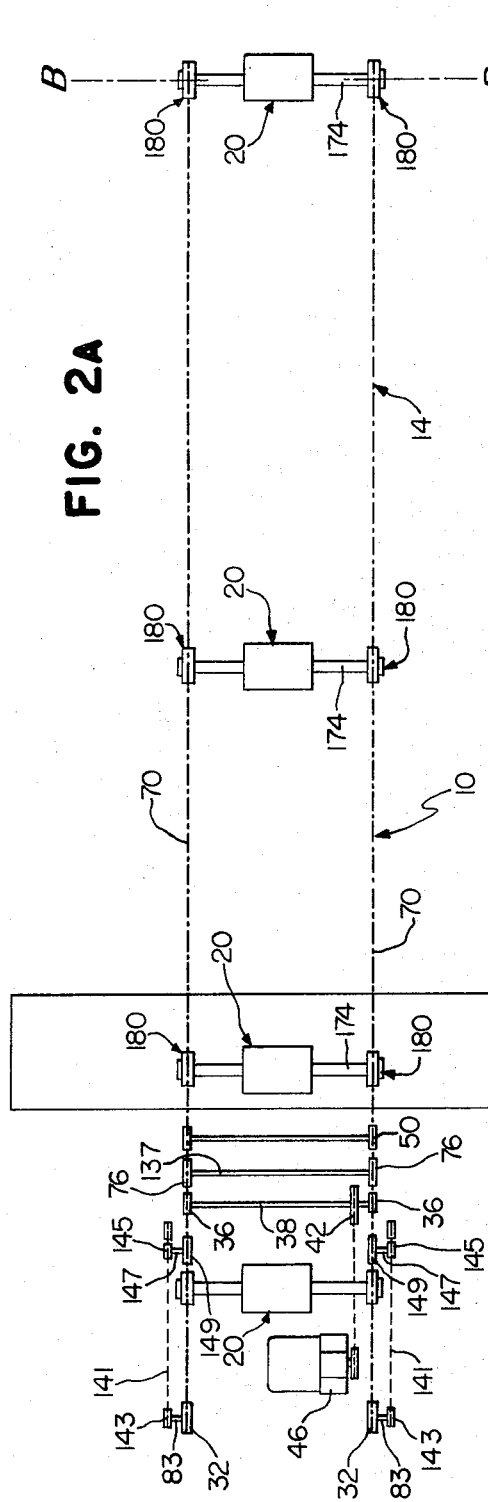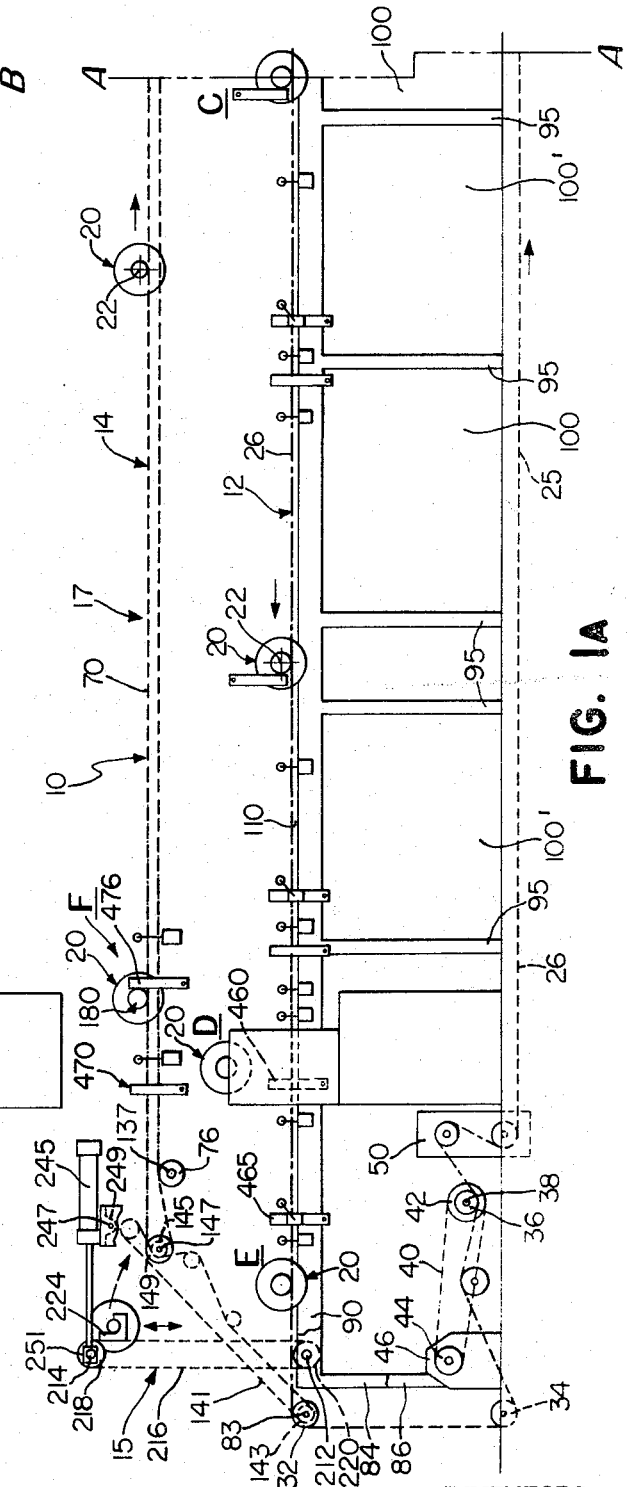

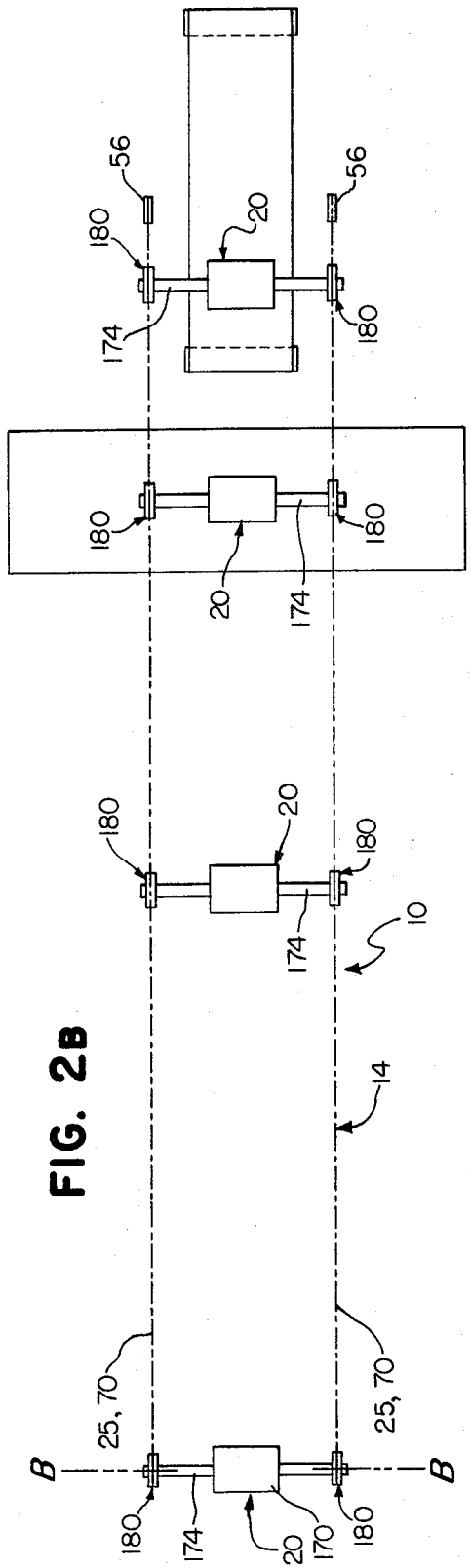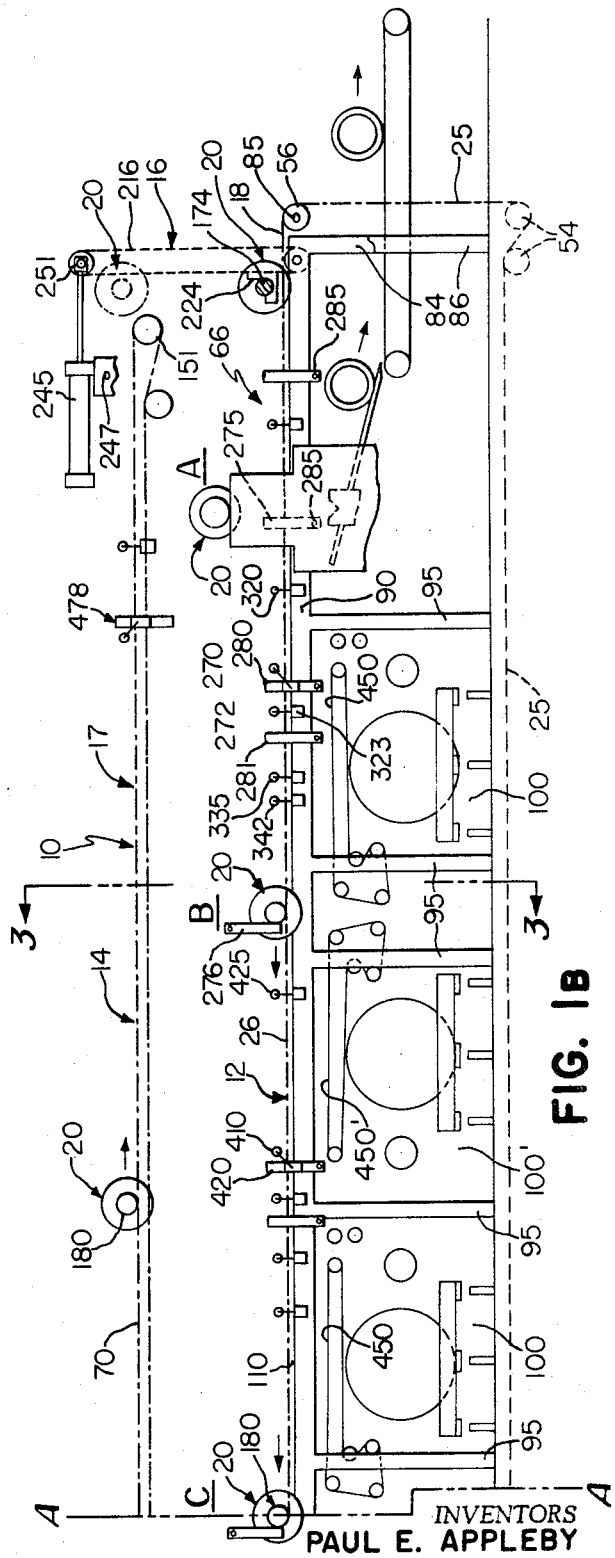

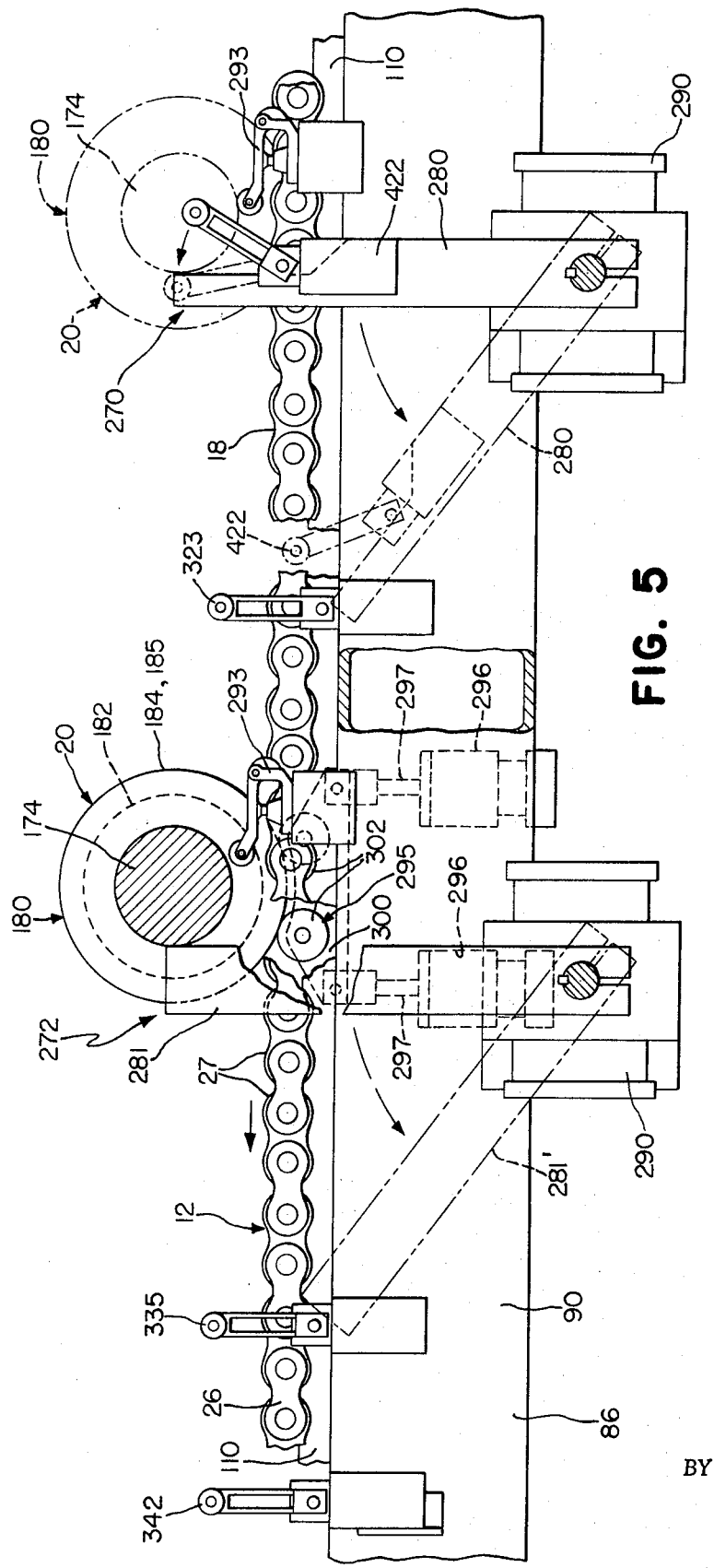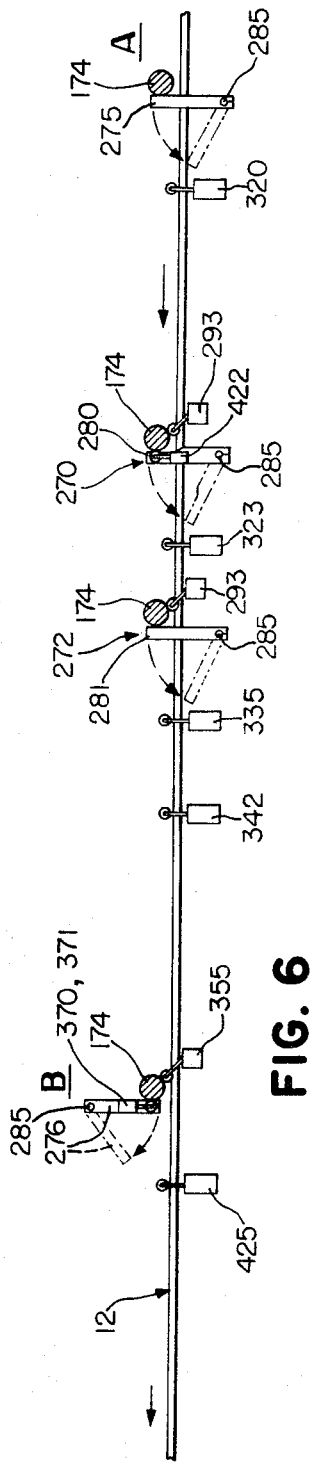

United States Patent Office 3,676,260
Patented July 11, 1972

3,676,260
TIRE BUILDING APPARATUS
Paul E. Appleby, Cuyahoga Falls, Robert S. Riggs, Stow, and Edwin S. Woodhall, Cuyahoga Falls, Ohio, assignors to The Goodyear Tire & Rubber Company, Akron, Ohio
Filed July 6, 1970, Ser. No. 52,214
Int. Cl. B29h 17/14
U.S. Cl. 156—396      28 Claims

ABSTRACT OF THE DISCLOSURE

Tire building apparatus disclosed features a spaced apart parallel pair of continuously moving conveyors of roller chain on which a plurality of collapsible tire building drums are carried. Each drum has an extended center shaft having a freely rotatable bearer at each end which rests on and is moved by engagement with seats afforded by the side link edge shapes of the roller chain. Mechanism for collapsing and expanding the drum includes a right and lefthand screw housed in the hollow center shaft. At successive work stations disposed along the conveyors each drum is stopped by swing arms movable to arrest the drum and is lifted and chucked on centers which coaxially engage the ends of the shaft. Each work station accommodates apparatus which performs a single operation, e.g. applying a liner or a cord ply, setting tire beads, enfolding carcass ply or plies about the beads, applying tread or tread and sidewall stitching, and removal of a completed carcass from the drum. Each work station is operable at its own rate and in its own time interval, relatively independently of preceding and succeeding stations. Holding stations disposed between immediately adjacent work stations have swing arms which stop forward movement of a drum on the conveyor until the following work stations can receive it. The apparatus includes a pair of upper conveyors movable continuously and oppositely above the first pair, as well as a drum elevating and a drum lowering device, which cooperate with the upper conveyors to transfer a drum with a completed tire carcass thereon back to the starting position on the first conveyor.

---

The foregoing abstract is not to be taken as limiting the invention of this application, and in order to understand the full nature and extent of the technical disclosure of this application, reference must be made to the accompanying drawings and the following detailed description.

This invention relates to tire building apparatus, particularly of the class in which a plurality of tire building drums are moved successively through a plurality of work stations, in certain of which one or two individual components of a tire carcass is or are successively applied to each building drum or to a previously applied component thereon.

A principal object of the invention is the provision of apparatus in which successive tire drums are conveyed through successive work stations and in which work stations individual operations are performed independently and generally concurrently but without requiring positive synchronism of either duration or rate of such individual operations.

A further object of the invention is the provision of conveying means for supporting and moving unitary tire building drum assemblies through the apparatus, which conveying means are driven continuously, while at the same time providing that the tire buiding drum assemblies themselves are carried through the apparatus, without need for auxiliary carriage devices or other separable appliances, and are selectively driven by and with the conveying means or stopped at certain preselected locations without interruption of the continuously moving conveying means.

Another object of the invention is to provide for the retention of a tire carcass for a time period upon the drum on which it is built after the last component has been applied and before the tire carcass is itself stripped from the drum.

Other features, objects, and advantages of the invention will be particularly pointed out or will become apparent from consideration of the particular embodiment set forth by way of illustration in the description which follows and in the drawings annexed hereto in which:

FIGS. 1a and 1b are parts of a schematic elevation view of an apparatus illustrating the invention, which parts are joined as indicated by the lines A—A;

FIGS. 2a and 2b are schematic plan views of parts of the apparatus of FIG. 1, which parts are joined as indicated by the lines B—B;

FIG. 5 is an enlarged portion in elevation showing additional details of the apparatus of FIG. 1;

FIG. 6 is an enlarged schematic view in elevation illustrating elements of the apparatus of FIG. 1;

Figure 3:
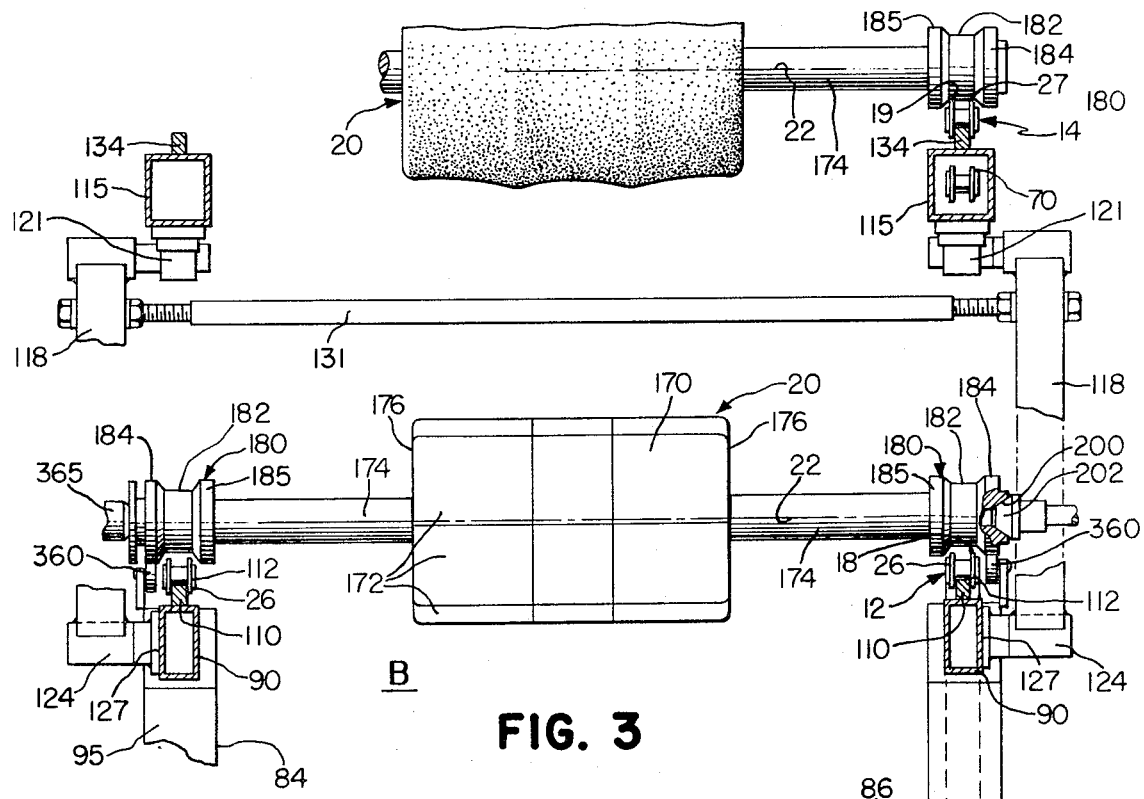
FIG. 3 is a transverse elevation partially in cross-section taken as indicated by the line 3—3 in FIG. 1b.

Referring to the drawings and particularly to FIGS. 1a, 1b, 2a, 2b, and 3; the tire building apparatus 10 according to the invention includes a lower conveyor 12, and an upper conveyor 14. The respectively associated ends of the conveyors 12 and 14 are connected by an elevating device 15 and a lowering device 16 which with the upper conveyor 14 comprise a transfer system 17.

The conveyors 12 and 14 provide upwardly exposed surfaces 18 and 19 which are continuously movable longitudinally and which support and move a plurality of tire building drum assemblies 20 through a plurality of successive work stations, A through E, spaced along the length of the conveyor 12 and from the device 15 to the device 16 along the conveyor 14. The axes 22 of the drum assemblies are disposed horizontally and perpendicular to the direction of their movement by the conveyors 12 and 14. The conveyor 12 comprises a pair of parallel spaced apart endless flexible members in the form of loops 25 of conventional roller chain 26 which are synchronously and continuously driven as will presently appear. The surfaces 18, 19 are provided with a multiplicity of seats 27 disposed in pairs in regular laterally opposed alignment, which seats engage means on the drum assemblies 20 to support and to move the same. The seats 27 are conveniently provided by depressions in the upwardly facing edges of the side bars which connect immediately adjacent pairs of the rollers of the chain.

While the return portions of the endless loops 25 of the chain 26 may follow any convenient path, in the apparatus 10 the loops extend downwardly from the sprockets 32 and about the idler sprockets 34 to wrap the driving sprockets 36 which are mounted for corotation on the jack shaft 38 and are driven by a drive chain 40 connecting the sprocket 42 on the jack shaft and the sprocket 44 keyed on the output shaft of the gear reducer 46 which is driven conventionally by a motor. From the driving sprockets 36, the chains 26 are turned about the sprockets of a conventional slack takeup device 50 and extend through the channels 52 formed in the floor beneath the apparatus to the sprockets 54 from which they extend upwardly to the sprockets 56 at the starting end of the respective surfaces 18.

The transfer system 17 comprises the elevator device 15, the upper conveyor 14, and a lowering device 16, which cooperate to transfer a tire building drum 20 with a tire carcass thereon from the final location thereof, the station E, on the conveyor 12, to an initial position or starting location 66 on the conveyor.

The upper conveyor 14 comprises a pair of endless flexible members in the form of a pair of roller chain loops 70 which are synchronously movable, the upwardly exposed surfaces 19 having seats 74 engageable with means on the drum assemblies to support and move the same in a direction parallel to and opposite the direction of movement of the conveyor 12. Each member of the pair of chain loops 70 is disposed vertically above and in a common plane with the corresponding loop 25 of the conveyor 12.

The return portions of the chains 70, suitable supported by the sprockets 76, are extended immediately beneath and generally parallel to the upper surface 19.

The apparatus frame comprises a near side frame 84 and a far side frame 86, as seen in FIGS. 1a and 1b, each of which has a main beam 90 extending from end to end of the respective conveying surfaces 18 and formed of individual section lengths supported by the columns 95.

The bays 100, 100' into which supply units are removably positioned for supplying individual components of the tires to be built by the apparatus, are provided beneath the beams 90 and between respective pairs of the columns 95.

In order to guide and support the conveying surfaces 18 of the roller chains 26, a guide rail 110 is secured longitudinally along the top of each of the main beams 90. Rollers of the chains 26 roll on the top surface of the guide rails 110 while the side bar links 112 of the respective chains straddle the sides of the rails to prevent significant lateral movement of the chains as they travel along the length of the rails 110 from the sprockets 56 to the sprockets 32. Each of the sprockets 32 is mounted and keyed on one of a coaxial pair of shafts 83 each of which is mounted rotatably in suitable bearings fixed in the brackets upon the ends of the respective beams 90. Each sprocket 56 is fixed upon one of a pair of shafts 85 carried rotatably in bearings secured on suitable brackets at the opposite ends of the respective beams 90, the rails 110, and the conveying reach or surfaces 18 of the chains extending between the respective sprockets 32 and 56.

The respective frames 84 and 86 further include a pair of upper beams 115 disposed parallel to and vertically above the respective main beams 90. To support the beams 115, a plurality of struts 118 are fixed between the mounting brackets 121 secured to the lower surface of the upper beams 115 and corresponding mounting brackets 124 affixed to the laterally outward vertical faces 127 of the main beams 90. The struts 118 of the respective side frames 84, 86 are spaced laterally apart sufficiently more than the overall axial length of the drum assemblies 20 to allow unimpeded movement thereof by the chains 26 and are connected by suitable cross ties 131. Each of the upper beams 115 has a guide rail 134 affixed longitudinally on its top surface to support and guide the conveying reach of the upper chains 70 in the same manner as the rails 110 support the reach of the chains 26.

Referring particularly to FIGS. 1a and 2a; the individual chains of the main conveyor 12 are synchronized in their continuous movement by the jack shaft 38 on which the sprockets 36 are corotatably mounted to drive the chains. The individual chains 70 of the upper conveyor 14 are likewise synchronized with each other by the cross shaft 137 on which the sprockets 76 are corotatably mounted. The upper conveyor 14 is driven in timed relation with the conveyor 12 by the endless roll chain loops 141 which respectively engage the sprockets 143 mounted and keyed on the respective shafts 83 laterally outwardly of the sprockets 32 thereon, and the sprockets 145, each of which is corotatably mounted on one of a pair of coaxial shafts 147 rotatable in suitable bearings affixed at the proximate ends of the respective upper beams 115. The respective chains 70 extend from the sprockets 149, mounted corotatably on the respective shafts 147 to the sprockets 151 carried rotatably on suitable bearings at the remote ends of the respective beams 115 and rails 134.

The return portions of the chains 70 of the upper conveyor are accommodated within the hollow beams 115.

Referring to FIG. 3; the apparatus includes a plurality of the tire building drum assemblies 20, each of which comprises a drum 170 having a cylindrical building surface formed by a plurality of rigid retractable segments 172 mounted upon a central coaxial shaft 174 extending through the drum 170 and axially outwardly of the respective shoulders 176 thereof to accommodate, adjacent each of its axial ends, a bearer in the form of a housing 180 which is freely rotatable on and coaxial with the shaft 174. Each bearer has a cylindrical medial surface 182 between two annular flanges 184, 185 extending outwardly of the surface 182 to define a trapezoidal annular groove between the flanges. Arcuate portions of the medial surfaces 182 are engageable with respectively laterally opposite seats 27 of the chains 26 to support and drivingly engage the drum 20, yet be readily and conveniently releasable therefrom. The circumferential flanges 184, 185 of the bearers serve to guide the medial cylindrical surfaces 182 into engagement with the conveying surface of the respective chains and tend to prevent transverse or angular misalignment of the drum 20 with respect to the direction of travel, but without interference with continuing movement of the chains when a drum assembly is purposely stopped thereon.

Referring to FIG. 3; the apparatus includes a plurality of work stations in certain ones of which each drum 20 is successively received and elevated a suitable distance from the conveying surfaces 18. When a drum 20 is elevated in such work stations, hollow coned centers 200 formed in the ends of the shafts 174 are engaged by coned plug centers 202 in much the same manner as a work piece in a conventional engine lathe. Inasmuch as the particular details of individual work stations are beyond the scope of the present invention, this description will not be burdened with such details. It will suffice to point out that the respective plug centers 202 in each work station are extendable into scure engagement with the centers 200 and are retractable therefrom. The plug centers 202 may be adapted either to drive the drum in rotation or to prevent rotation of the drum, or to permit free rotation of the drum as the nature of the operation assigned to the particular work station may dictate.

Figure 4:
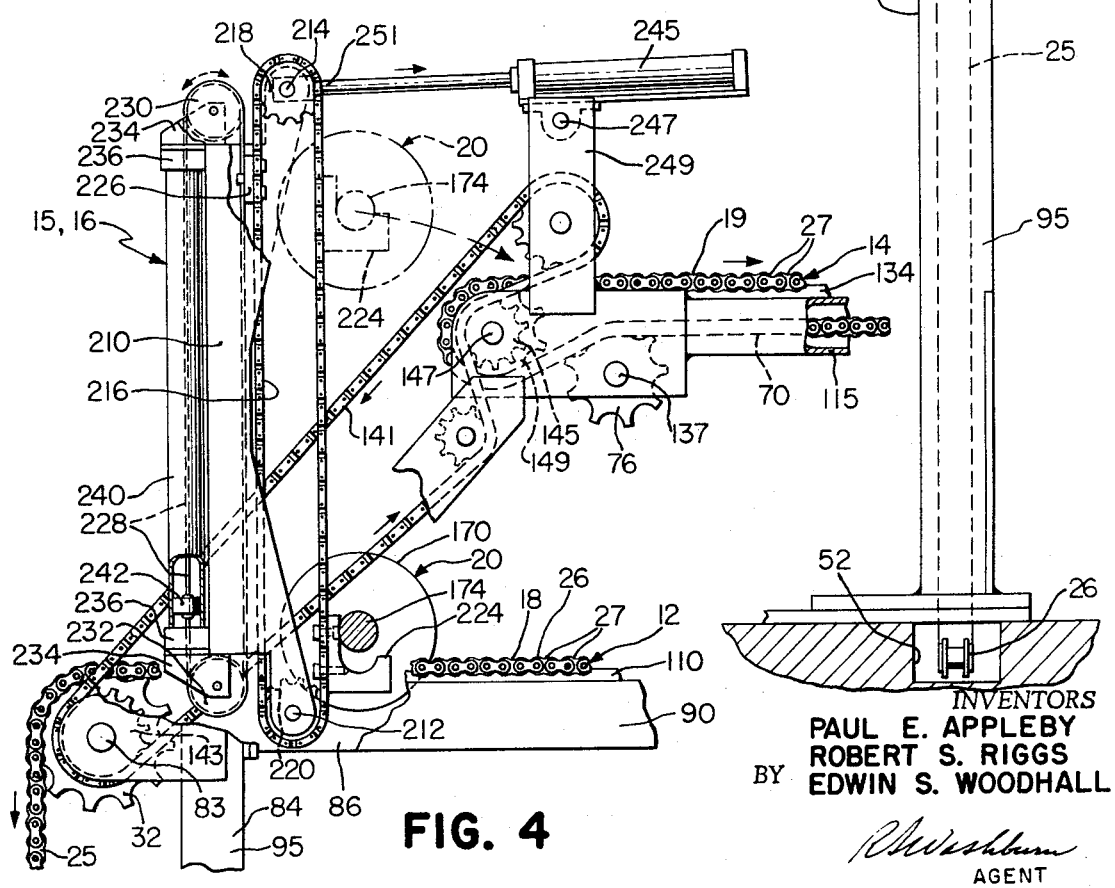
FIG. 4 is an enlarged partial elevation illustrating portions of the apparatus of FIGS. 1a and 1b.

Making reference to FIG. 4; the previously mentioned elevating device 15 and lowering device 16 are in all significant respects identical. As may be seen in FIG. 1, the devices are mounted oppositely at the respective ends of the conveyor 12 and appear opposite in hand. A decription of one will suffice for both inasmuch as the operating sequence of events by which they differ will be apparent and readily accomplished by adjustments which are well known to persons ordinarily skilled in the art.

Each device 15, 16 includes a pair of channel section frames 210. The lower end of each frame 210 is mounted on a cross shaft 212 which extends between the main beams 90 and is rotatably supported by suitable bearings affixed to the outer walls 127 of the main beams. A second cross shaft 214 is rotatably mounted in suitable bearings secured in the upper ends of the respective frames 210. Each frame 210 has an endless chain loop 216 disposed between its sidewalls and about a pair of sprockets 218, 220 mounted respectively corotatably on the upper 214 and lower 212 cross shafts, so that the respective chains 216 are movable synchronously with each other. A pair of hooks 224 each engageable with the center shaft 174 between the shoulder 176 and the respectively associated bearer 180 of a drum assembly 20 are securely fixed to the respective chain loops 216 at corresponding positions on the circumferences thereof. A clamp 226 is fastened to a portion of each chain loop 216, diametrically opposite, which is to say circumferentially midway from the respective hook 224, and each to one of a pair of endless flexible cables 228 having inextensible cores and cylindrical flexible covers of a material such as nylon. Each cable is wrapped respectively arcuately around an upper sheave 230 and a lower sheave 232 each of which is rotatably mounted in a bracket 234 formed integrally with a cylinder head 236. Each cable passes through sealing glands in the respective heads 236 of a cylinder operator 240 and is securely affixed to a piston 242 therein at a location in the cable circumference diametrically opposite the clamp 226. The piston, cylinder, heads, brackets, sheaves, and endless cable form a conventional assembly obtainable commercially as the "Hanna Cable Air Cylinder," Hanna Co., division of Rex Chain Belt, Inc., Chicago, Ill.

As will be apparent from the description and from FIG. 4, admission of compressed air or fluid at the upper ends of the cylinder operators 240 will push the pistons 242 downward and the clamps 226 upward, which movement causes the chain loops 216 to rotate about the respective sprockets and to carry the hooks 224 to their lowermost position. Compressed fluid admitted to the lower ends of the cylinders, on the other hand, causes the pistons to move upwardly and in like manner the drum engaging hooks 224 also to move upwardly into the positions shown in phantom lines.

To swing the respective frames 210 toward and away from the upper conveyor 14, a compressed fluid cylinder operator 245 is pivotally mounted on a cross shaft 247 carried in the brackets 249 affixed one to each of the upper beams 115. The piston rod end 251 has a clevis which is rotatably secured to the cross shaft 214 at about its mid-point. As will be apparent, the device, as seen in FIG. 4, will elevate or lower a drum vertically; furthermore, by swinging the frames 210 of the device about the cross shaft 212 affixed relative to the conveyor 12, will carry a drum toward or away from the upper conveyor. The elevating device 15 operates to lift a drum from the main conveyor 12 upwardly and to deposit the drum on the upper conveyor 14. The lowering device 16 operates to receive a drum from the conveyor 14 and to move it arcuately and downwardly to engagement with the main conveyor 12.

According to one aspect of the invention, a tire building drum assembly supported on and moved by the conveyors 12, 14 can be stopped at certain predetermined locations without interrupting the travel of either conveyor.

Making reference to FIGS. 5 and 6; the work stations A and B are representative of the plurality of such stations spaced along the length of the conveyor 12. The holding stations 270, 272 are located upstream from the respectively associated work station, B, in order to stop and hold a drum assembly 20 temporarily until such associated work station, B, is ready to receive a next drum assembly.

As may be seen in FIGS. 5 and 6, stop means for arresting the forward movement of one drum assembly are associated with the respective work stations and with the holding stations disposed therebetween. The stop means include elements which are selectively movable into and out of engagement with a drum assembly. In the apparatus 10 such elements are provided by the swing arms 275 and 276, respectively associated with the work stations A and B, and by the arms 280 and 281 associated with the holding stations 270, 272. The arms are mounted in pairs on cross shafts 285 which extend transversely of the conveyor 12 between the respective side frames 84, 86. One end of each cross shaft is coupled in line with the output shaft of a compressed fluid rotator 290 fastened on the frame 86, the other end being supported in a conventional pillow block (not shown) fixed to the near side frame 84. The arms 281, as shown in FIG. 5, are caused to swing by the rotator 290 between a position 281', seen in phantom outline, clear of the movement of the drum assembly, and a position in which the forward movement of the drum assembly 20 by the conveyor 12 is arrested by the arms 281. An air switch 293 mounted on the main beam 90 is actuated by the movement of the center shaft 174 thereover. Compressed fluid admitted to the rotator 290 to raise the arms 281 into its drum arresting position is admitted by the actuation of the air switch 293 to the lift unit 295 comprising cylinders 296 mounted on the outer wall 127 of each beam 90. The piston rods 297 of the two cylinders 296 are connected by clevises to a bar 300 having a pair of rollers 302 rotatably affixed thereon. The rollers 302 are engageable with the peripheral surface of the outer flange 184 of each of the bearers on the drum so that actuation of the stop arms 281 and of the air switch 293 cause the drum assembly 20 to be lifted out of engagement with the conveyor 12. As the rotator 290 is reversed to move the arms 281 to the retracted position, the lift cylinders 296 are exhausted to lower the drum assembly again into engagement with the conveyor. As will be apparent, the arrangement described for the arm 281 is duplicated by that associated with the arms 275 and 280. Arrangement of the arms 276 is alike in all respects except that the associated operating shaft 285 and its rotator are disposed above the path of the drum assemblies transported by the conveyor 12.

Figure 7:
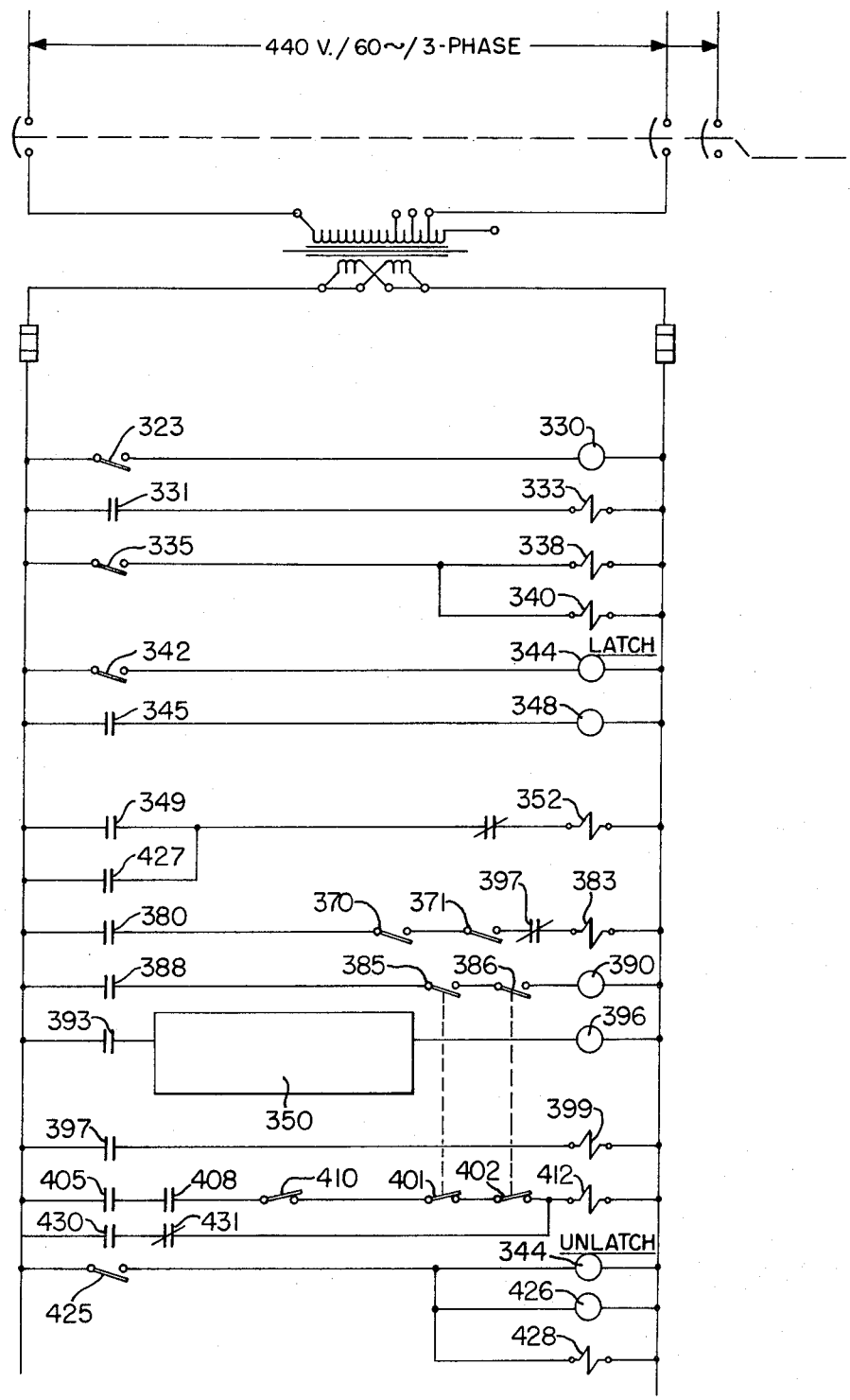
FIG. 7 is a diagram illustrating a portion of the control circuitry of the apparatus of FIG. 1, with particular reference to the schematic view of FIG. 6.

Referring now to FIGS. 6 and 7; the adjacent successive work stations A and B and the holding stations 270, 272 therebetween, as illustrated and described herein, are representative of adjacent pairs of successive work stations, e.g. stations B and C, or stations D and E, along the length of the conveyor 12. Any convenient number of holding stations may be disposed between adjacent work stations but in general two have been found satisfactory. Immediately following the work station A in the direction of travel of the conveyor 12, a limit switch 320 affixed to the main beam 90 in a position to be actuated by a drum assembly moving thereover operates to restore the work station A to a ready state as will presently appear. A drum assembly may travel without stopping on the conveyor 12 to the next work station B if the same is not occupied, the arms 280 and 281 being disposed in their retracted positions. A limit switch 323 attached to the main beam 90 to be actuated by the movement of a drum assembly thereover is actuated to energize the relay 330, contacts 331 of which energize the solenoid valve 333 which admits compressed fluid to the rotator 290 to raise arms 280 into their drum engaging position. The limit switch 335 attached to the main beam 90 immediately downstream from the stop arms 281 is actuated to energize solenoid valves 338 and 340 which respectively admit fluid to the rotators 290 to extend arms 281 and to retract arms 280. The limit switch 342 affixed to the main beam immediately following the limit switch 335 is actuated to energize the latching relay 344, contacts 345 of which energize the relay 348 which is employed to initiate a preprogrammed work cycle in the programmer 350 controlling the work station B. Contacts 349 of the relay 348 on being closed energize the solenoid valve 352 to admit fluid to a rotator 290 connected with the arms 276 of work station B. The air switch 355 actuated by entry of the drum assembly into the work station B, admits compressed fluid, to the lifting units 360 (FIG. 3) identical to the unit 295 previously described, to lift the drum assembly into coaxial alignment with the plug centers 365 of the work station B. The limit switches 370 and 371 attached respectively one on each of the arms 276 are closed to complete a circuit through the contacts 380 of the relay 348 to energize the solenoid valve 383 by which the centers 365 are extended into engagement with the ends of the center shaft 174.

With the centers fully extended into engagement with the drum, limit switches 385 and 386 are closed, completing a circuit through contacts 388 of relay 348 to energize a control relay 390 the contacts of which energize a circuit (not shown) by which the preprogrammed work cycle of the particular work station is started. Upon completion of such work cycle a signal produced by the work cycle programmer 350 completes a circuit through contacts 393 of the control relay 348 to energize the relay 396 the contacts 397 of which energize a solenoid valve 399 to retract the centers 365. Retraction of the centers closes contacts 401, 402 respectively of the limit switches 385 and 386 to complete a circuit through contacts 405 of control relay 348 and contacts 408 of control relay 396 through a limit switch 410 to energize the solenoid valve 412 which admits fluid to the rotator 290 to retract the arms 276 and simultaneously to lower the rollers of the lift unit 360. The limit switch 410 is mounted upon the arms 420 (FIG. 1b) in a manner identical to that shown in FIG. 5 wherein a limit switch 422 is mounted upon the arms 280. As will be apparent, the drum assembly cannot be discharged from the work station B if the immediately following holding station is occupied. A limit switch 425 affixed to the main beam 90 immediately downstream of the work station B is actuated to unlatch the latching relay 344 which, as previously indicated, restores the circuit described to its ready state. The circuit through the limit switch 425 also energizes the relay 426, the contacts 427 of which energize again the solenoid 352 to extend the stop arms 276 as well as the solenoid valve 428 admitting fluid to the rotator 290 to retract arms 281, and the lift unit 360, thereby to allow a next succeeding drum to enter the work station B.

It will now be evident that the stop arms 276 are retracted in response to energizing of the solenoid valve 412 which is effected when the programmed work cycle is complete, in response to the energizing of the control relay 396, and when the next succeeding station is available; or when control relay 348 is not energized, its contacts 431 being normally closed, and the control relay 430 associated with the next succeeding station is energized to initiate the working cycle for that station.

The operation of the apparatus will have become generally apparent from the preceding description thereof. The specific apparatus 10 disclosed herein may accommodate as many as thirty tire building drum assemblies and is fully operable with as few as twelve. The operation will be described by following a single tire building drum assembly, noting that the drum assembly may or may not be arrested in any one or more of the above-described holding stations, depending only upon the readiness of the immediately succeeding station to accept the building drum.

Referring again to FIGS. 1a and 1b, a tire building drum 20 is deposited on the conveyor 12 by the lowering device 16 at a location 66 in advance of the initial station A. The initial station is a holding station having a single pair of stop arms 281. When normal continuous operation of the apparatus has been established, the drum will have thereon a tire carcass ready for removal and is carried into the work station A which comprises a mechanism for removing the tire carcass from the building drum and for depositing that carcass on conveying means to be taken away from the apparatus. The particular details of such mechanism are not within the scope of the present invention and need not be further described herein. After the tire carcass is stripped from the drum, the drum, ready to receive the components of a next tire carcass, is lowered to the conveyor 12 and the stop arms 275 are retracted, whereupon the drum is conveyed through the holding stations 270 and 272, which have been described, to the liner work station, B, where the drum shaft is engaged by stop arms 276, elevated, and chucked by the centers 365. Arms 281, it will be noted are now extended to stop a next succeeding drum assembly which will be there held until operation in the work station, B, is complete and the drum moves onward to actuate the limit switch 425.

Certain of the bays 100, 100′ are provided with supply units containing tire building components, for example, a carcass liner or a cord ply stock, and from each of which units the component material thereon is trained over an application belt 450 adapted to be moved into arcuate wrapping engagement with the building drum held in the associated work station. The application belt is operable to rotate the drum and to apply thereto a precut length of a particular component material. As illustrated in FIG. 1b the work station is disposed midway between the bays 100, 100′ each of which accommodates a supply unit. A second application belt 450′ like the first but opposite in hand is adapted to apply a second component of ply stock to the drum. When the preprogrammed operation in such work station has been completed, a signal from the work cycle programmer 350 associated with that station energizes the control relay 396 whereupon the stop arms 276 are retracted and the drum reengaged with the conveyor 12 for onward movement. Forward movement of the drum engages the limit switch 425, restoring such work station and its associated holding stations to their ready state.

It will now be apparent that the movement of the drum assembly through the succeeding holding stations and work stations repeats the operations just described.

In order to apply conventional bead reinforcing wires or grommets, the work station D is provided with a mechanism operable to place bead grommets in suitable engagement with the carcass plies which have been applied to the drum and then to enfold the grommets by turning the edge portions of the tire cord plies around the same. As before, completion of the operation in the work station D provides a signal in response to which the drum is again lowered and reengaged with the conveyor 12. The stop arms 460 are retracted and the drum assembly proceeds through the holding station 465 into station E on which the tread or tread-and-sidewall portion is wrapped about the carcass, in any known manner. On completion of the opertion of the tread work station E, the drum assembly is engaged by the hooks 224 of the elevating device 15 and lifted thereby vertically to a suitable elevation, the elevating device then being swung to deposit the drum assembly upon the upper conveyor 14.

In the apparatus 10 a holding station 470 substantially like the station 270 and a further work station F having stop arms 476 are associated with the upper conveyor 14. A conventional tire carcass and tread stitching mechanism is mounted between the main conveyor 12 and the upper conveyor 14 and is provided with the usual stitching rollers which operate to consolidate the components of the tire carcass. As with the previously described work stations, the completion of the stitching operation provides a signal causing the arms 476 to retract, allowing the drum assembly with the tire carcass thereon to be transported by the conveyor 14 in the direction opposite to and parallel the direction of the conveyor 12 to or through a holding station 478 and thence to the tire lowering mechanism 16, the hooks 224 of which are positioned to receive the drum. The lowering device is then swung into its vertical position as seen in FIG. 1b and the drum is lowered to the starting location on the conveyor 12.

The transfer conveyor system 17, in being placed above and parallel to the main conveyor 12, provides not only the advantage of a saving in floor space but the further advantage of retaining the carcass in place on the drum on which it is built for a time during which it is transported from a later work station to an earlier work station in the operating sequence of the stations along the conveyor 12 and while the components of the tire and particularly the tread are partially cooled.

It will now be apparent that each individual work station in the apparatus 10 can perform independently, generally concurrently, without necessity for positive synchronism, either of duration or of starting or finishing time, with any or all of the other stations. The conveyor chain loops 25 and 70 both travel continuously without interruption. By enabling each work station to have a time cycle for the completion of its particular assigned operation which is independent of the cycle or cycles of other work stations, there is provided an advantageous flexibility in assignment of work to individual stations and the freedom at least briefly to shut down a particular station, as when replacing an exhausted supply unit by a fresh supply unit, without causing a shutdown of entire apparatus.

While certain representative embodiments and details have been shown for the purpose of illustrating the invention, it will be apparent to those skilled in the art that various changes and modifications may be made therein without departing from the spirit or scope of the invention.

What is claimed is:

1. A tire building apparatus comprising a plurality of work stations, a plurality of tire building drum assemblies each having a rigid cylindrical surface provided by a plurality of radially retractable segments and a coaxial center shaft extending axially outwardly thereof, a continuously movable conveyor for supporting and moving said drum assemblies, cooperably engageable means comprising a bearer having a flanged housing with a trapezoidal annular groove circumferentially thereabout mounted rotatably on the outward end of said shaft of each of said drum assemblies and on said conveyor for providing a releasable driving connection respectively between each of the drum assemblies and the conveyor, and stop means selectively engageable with each drum assembly and operable to stop the same at a predetermined location along said conveyor without stopping the conveyor.

2. Apparatus as claimed in claim 1, said conveyor comprising a pair of parallel spaced apart members each providing a continuous upwardly exposed surface movable in synchronism with the other of said pair.

3. Apparatus as claimed in claim 2, said cooperably engageable means on said conveyor comprising a multiplicity of seats disposed in pairs in regular laterally opposed alignment respectively in each said surface.

4. Apparatus as claimed in claim 3, wherein said members are endless flexible members mounted for continuous movement along a closed path.

5. Apparatus as claimed in claim 4, wherein said members are roller chain, said seats being formed in the upwardly facing edges of the respective side links of the roller chain between immediately adjacent rollers thereof.

6. Apparatus as claimed in claim 5, said drum assemblies including a drum, a central shaft extending coaxially of and outwardly of the ends of the drum, a pair of bearers disposed adjacent the axially outward ends of the shaft providing said cooperably engageable means for said releasable driving connection with said chain edges.

7. Apparatus as claimed in claim 1, including a plurality of said stop means, at least one of said stop means being associated with each work station.

8. Apparatus as claimed in claim 7, including at least one holding station associated respectively with each said work station, and said stop means comprising a pair of elements selectively movable into and out of engagement with a drum assembly at a predetermined location thereof on the first said conveyor, and a powered operator connected to move said elements.

9. Apparatus as claimed in claim 8, including a pair of drum lifters associated with at least one of each of said work and said holding stations and operable to disengage and to engage a drum assembly and said conveyor.

10. A tire building apparatus comprising a plurality of work stations, a plurality of tire building drum assemblies, a continuously movable conveyor for supporting and moving said drum assemblies, a transfer conveyor disposed above the first said conveyor for transferring said drum assemblies each with a tire thereon from a later one to an earlier one in the operating sequence of said work stations, cooperably engageable means on each of said drum assemblies and on each said conveyor providing a releasable driving connection between each of the drum assemblies and each said conveyor, and stop means selectively engageable with each drum assembly and operable to stop the same at a predetermined location along at least one said conveyor without stopping either said conveyor.

11. Apparatus as claimed in claim 10, said transfer conveyor comprising a pair of members having continuous upwardly exposed parallel and laterally spaced apart surfaces movable continuously in synchronism with each other.

12. Apparatus as claimed in claim 11, said cooperatively engageable members on said conveyor comprising a multiplicity of seats disposed in pairs in laterally opposite alignment respectively in the respective surfaces.

13. Apparatus as claimed in claim 12, said members each being an endless flexible member movable in a closed path.

14. Apparatus as claimed in claim 13, said members comprising roller chain, said seats being formed in the upwardly facing edges of the bar links of said chain between the immediately adjacent rollers thereof.

15. Apparatus as claimed in claim 10, said transfer conveyor including an elevating device and a lowering device respectively for elevating a drum assembly from said continuous conveyor to said transfer conveyor and for lowering a drum assembly from said transfer conveyor to said continuous conveyor.

16. Apparatus as claimed in claim 15, each said device comprising a pair of synchronously movable flexible endless elements, a pair of hooks correspondingly affixed one on each of said elements, and intermittently operable drive means connected to said elements for synchronous movement thereof.

17. Apparatus as claimed in claim 16, at least one of said devices including a frame pivotally mounted for swing movement about an axis fixed relative to the first said conveyor to be swingable toward and away from said transfer conveyor.

18. Apparatus as claimed in claim 17, wherein said devices are mounted respectively one at each end of the conveying reach of the first said conveyor.

19. Apparatus as claimed in claim 18, the first said conveyor and said transfer conveyor each comprising a pair of parallel endless flexible members, each member of each pair being disposed in vertically coplanar relation with the corresponding member of the other pair, the respective said pairs being continuously movable along vertically spaced parallel paths in relatively opposite directions.

20. Apparatus as claimed in claim 19, each of said endless flexible members consisting of roller chain, said cooperatively engageable means on each said conveyor comprising a multiplicity of seats defined by upwardly facing edges of side bars of said roller chain, each of said drum assemblies having a pair of bearers each having an arcuate surface for cooperative engagement with said seats to move said drum assemblies with the respective rotational axes of said drum assemblies being disposed normal to the directions of travel of the respective conveyors.

21. A tire building apparatus comprising a plurality of work stations, a plurality of tire building drum assemblies, a continuously movable conveyor for supporting and moving said drum assemblies, cooperably engageable means on each of said drum assemblies and on said conveyor for providing a releasable driving connection respectively between each of the drum assemblies and the conveyor, a plurality of stop means each selectively engageable with each said drum assembly, at least one of said stop means being associated with each said work station and operable to stop a selected drum assembly at a predetermined location along said conveyor without stopping the conveyor, at least one holding station associated respectively with each said work station, a pair of drum lifters associated with at least one of each of said work and said holding stations and operable to disengage and to engage a drum assembly with said conveyor, and a sensing device responsive to the presence of a drum assembly in the respectively associated station, said stop means each comprising a pair of elements selectively movable into and out of engagement with a drum assembly at a predetermined location thereof on said conveyor.

22. Apparatus as claimed in claim 21, each said conveyor comprising a pair of spaced parallel members having upwardly exposed continuously movable surfaces movable in synchronism with each other.

23. Apparatus as claimed in claim 22, said members being endless flexible members movable in a continuous closed path.

24. Apparatus as claimed in claim 23, further including a transfer conveyor disposed above the first conveyor for transferring said drums each with a tire thereon successively between a work station and a non-adjacent work station upstream in the direction of movement of the first said conveyor.

25. Apparatus as claimed in claim 24, said transfer conveyor comprising a pair of continuously movable members having upwardly exposed surfaces, said means cooperatively engageable on said conveyor comprising a multiplicity of seats disposed in pairs in laterally opposite alignment in the respective surfaces.

26. Apparatus as claimed in claim 25, said transfer conveyor including an elevating device and a lowering device including a pair of endless flexible elements, a pair of shaft engaging hooks affixed respectively one on each of said flexible elements, and a compressed fluid operated reciprocating drive connected to said flexible elements for synchronous movement thereof.

27. Apparatus as claimed in claim 26, wherein the first said conveyor and said transfer conveyor each comprise a pair of endless flexible members, each member of each pair being disposed in vertically coplanar relation with the corresponding member of the other pair, the respective said pairs being continuously movable along vertically spaced parallel paths in relatively opposite directions.

28. Apparatus as claimed in claim 27, each of said members comprising a roller chain, said cooperatively engageable means comprising a bearer coaxially and rotatably mounted on each respective end of said drum assembly, said bearer having a cylindrical surface disposed between an oppositely facing pair of radially outwardly extending flanges, an arcuate portion of said cylindrical surface being engageable drivingly with the upwardly facing edge surfaces of side links of said roller chain.

References Cited

UNITED STATES PATENTS

| | | | |
|---|---|---|---|
| 1,552,987 | 9/1925 | Harsel | 156—396 X |
| 1,818,955 | 8/1931 | Maas | 156—396 |
| 2,319,643 | 5/1943 | Sternad et al. | 156—396 |
| 3,088,197 | 5/1963 | Cargill | 29—430 |

STEPHEN C. BENTLEY, Primary Examiner